(12) United States Patent
Liu et al.

(10) Patent No.: US 10,866,094 B2
(45) Date of Patent: Dec. 15, 2020

(54) METHOD FOR MEASURING SPATIAL ROTATION ANGLES OF OBJECTS

(71) Applicant: Shanxi University, Shanxi (CN)

(72) Inventors: Kui Liu, Shanxi (CN); Juan Li, Shanxi (CN); Jiangrui Gao, Shanxi (CN)

(73) Assignee: Shanxi University, Taiyuan (CN)

( * ) Notice: Subject to any disclaimer, the term of this patent is extended or adjusted under 35 U.S.C. 154(b) by 0 days.

(21) Appl. No.: 16/514,918

(22) Filed: Jul. 17, 2019

(65) Prior Publication Data

US 2020/0025563 A1 Jan. 23, 2020

(30) Foreign Application Priority Data

Jul. 20, 2018 (CN) .......................... 2018 1 0805933

(51) Int. Cl.
*G01C 1/00* (2006.01)
(52) U.S. Cl.
CPC ...................................... *G01C 1/00* (2013.01)
(58) Field of Classification Search
CPC ......... G01N 2021/1793; G01N 21/643; G01N 21/6489; G01N 15/0211; G01N 2015/0222; G01N 2021/6432; G01N 2021/7786; G01N 21/3581; G01N 15/0205; G01N 15/1459; G01N 15/1463; G01N 2015/0053; G01N 2015/025; G01N 2015/1486; G01N 2015/1493; G01N 2015/1497;

(Continued)

(56) References Cited

U.S. PATENT DOCUMENTS

| | | | | |
|---|---|---|---|---|
| 2006/0153573 A1* | 7/2006 | Tomaru | ................. | H04L 9/0858 398/152 |
| 2014/0337400 A1* | 11/2014 | Chong | .................. | G01J 1/0425 708/255 |
| 2020/0125332 A1* | 4/2020 | Pooser | ...................... | G06F 7/58 |

FOREIGN PATENT DOCUMENTS

| CN | 102809367 A | 12/2012 |
|---|---|---|
| CN | 107490356 A | 12/2017 |
| CN | 105526907 B | 6/2018 |

OTHER PUBLICATIONS

"Super-resolving angular rotation measurement using binary-outcome homodyne detection" Zijing Zhang et al. Optics Express vol. 24, No. 16 Aug. 8, 2016.*

(Continued)

*Primary Examiner* — Michael P Stafira
(74) *Attorney, Agent, or Firm* — Wayne & Ken, LLC; Tony Hom (57) ABSTRACT

The present invention discloses a method for measuring a spatial rotation angle of an object, comprising steps of: controlling projection of probe light onto an object whose rotation angle is to be measured; controlling a balance homodyne detector, by which the probe light reflected or transmitted by the object whose rotation angle is to be measured is detected to obtain light parameters of the reflected or transmitted probe light; and calculating a rotation angle of the object whose rotation angle is to be measured, according to the light parameters detected by the balance homodyne detector. The device of the present invention is simple, easy to operate, and high in practicality. The measurement precision is high, and measurements of a rotation angle beyond the SNL (shot noise limit) can be realized. The present invention can be applied in high-tech fields such as precise manufacturing, spatial remote-sensing and bioimaging.

9 Claims, 7 Drawing Sheets

(58) Field of Classification Search
CPC .......... G01N 2021/4707; G01N 21/51; G01N 21/53; G01N 21/6408; G01N 21/77; G01N 15/042; G01N 15/10; G01N 15/1434; G01N 2015/0294; G01N 2015/1087; G01N 2015/1093; G01N 2021/3513; G01N 2021/6439; G01N 21/3504; G01N 21/39; G01N 21/474; G01N 21/49; G01N 21/63; G01N 21/645; G01N 21/8806; G01N 21/9501; G01N 2201/06113; G01N 2201/06193; G01N 2201/0636; G01N 22/00; G01N 22/02; G01N 24/006; G01N 24/008; G01N 24/10; G01N 2500/04; G01N 2500/20; G01N 27/02; G01N 33/0047; G01N 33/54366; G01C 21/28; G01C 21/3415; G01C 21/3492; G01C 21/36; G01C 21/3691; G01C 1/00; G01C 21/025; G01C 21/12; G01C 21/165; G01C 21/20; G01J 1/0425; G01J 1/0459; G01J 1/1626; G01J 2003/4332; G01J 3/108; G01J 3/42; G01J 3/433; G01J 3/4338; G01J 11/00; G01J 2005/0077; G01J 2005/202; G01J 3/0208; G01J 3/0218; G01J 3/4412; G01J 3/45; G01J 3/453; G01J 5/10; G01J 5/20; G01J 5/22; G01J 9/02; G01B 2290/70; G01B 11/14; G01B 11/272; G01B 9/02002; G01B 9/02011; G01B 9/02015; G01B 9/02016; G01B 9/02018; G01B 9/02019; G01B 9/02027; G01B 9/02041; G01B 9/02061; G02B 27/145; G02B 27/283; G02B 5/12; G02B 5/126; G02B 5/128; G02B 1/11; G02B 26/06; G02B 27/1086; G02B 5/3083; G02B 6/00; G02B 6/32

See application file for complete search history.

(56) References Cited

OTHER PUBLICATIONS

"Super-resolution and ultra-sensitivity of angular rotation measurement based on SU interferometers using homodyne detection" Jun Liu et al., J. OPt. 20 (2018).*

* cited by examiner

METHOD FOR MEASURING SPATIAL ROTATION ANGLES OF OBJECTS

CROSS-REFERENCE TO RELATED APPLICATIONS

This application claims the benefit of priority from Chinese Patent Application No. CN 201810805933.6, filed on Jul. 20, 2018. The content of the aforementioned application, including any intervening amendments thereto, is incorporated herein by reference in its entirety.

TECHNICAL FIELD

The present invention relates to the field of angle measurement and in particular to a method for measuring a spatial rotation angle of an object.

BACKGROUND OF THE PRESENT INVENTION

Quantum measurement is the organic combination of quantum mechanics and measurement theories. It provides us with novel measurement means and methods. It can help us better understand the performance of the quantum system and conduct precise quantum control, and further facilitate the rapid development of basic scientific research.

In the prior art, for the rotation-angle measurement, the NOON state with orbital angular momentum is used as the probe light source. This can realize rotation-angle measurement beyond the quantum limit. However, the NOON state has a small number of photons in average, resulting in low absolute measurement precision. On the other hand, the NOON state is particularly sensitive to the measurement loss, which is not conducive to practical application. In other techniques, the precise rotation-angle measurement is realized by employing weak measurements. The experimental equipment is simple. However, it is theoretically proved that this method is unable to realize rotation-angle measurement beyond the quantum limit.

SUMMARY OF THE PRESENT INVENTION

An objective of the present invention is to provide a method for measuring a spatial rotation angle of an object, to overcome the deficiencies of the prior art.

For this purpose, the present invention employs the following technical solutions. A method for measuring a spatial rotation angle of an object is provided, comprising steps of: controlling projection of probe light onto an object whose rotation angle is to be measured; controlling a balance homodyne detector, by which the probe light reflected or transmitted by the object whose rotation angle is to be measured is detected to obtain light parameters of the reflected or transmitted probe light; and calculating a rotation angle of the object whose rotation angle is to be measured, according to the light parameters detected by the balance homodyne detector.

Wherein, before the step of controlling projection of probe light onto an object whose rotation angle is to be measured, the method further comprises a step of modulating the probe light, the probe light being obtained by coupling coherent beams in a weak Hermite-Gaussian HG01 mode and a strong Hermite-Gaussian HG10 mode on a beam splitter.

Wherein, before the step of controlling projection of probe light onto an object whose rotation angle is to be measured, the method further comprises a step of squeezing the weak Hermite-Gaussian HG01 mode.

Wherein, the light parameters of the reflected or transmitted probe light at least comprise a photon number of the probe light, a level of squeezing, and a reflection or transmission coefficient of the object to the probe light.

Wherein, the rotation angle of the object whose rotation angle is to be measured is expressed by:

$$\Delta\theta = \frac{A}{2\sqrt{N}} e^{-r}$$

where, N is the photon number of the probe light, r is the level of squeezing of the orbital angular momentum, A is the reflection or transmission coefficient of the object to the probe light.

Wherein, as a way of rotating the object whose rotation angle is to be measured, the object whose rotation angle is to be measured is rotated by a PZT (piezo-electric transducer)-actuator based on the lever principle.

Wherein, the center of the object whose rotation angle is to be measured is the fulcrum of the PZT-actuator.

Wherein, the object whose rotation angle is to be measured is a Dove Prism.

Wherein, the probe light is interrogated by the balance homodyne detector using a 4 mW local oscillator beam on a spectrum analyzer to read measurement results.

Different from the prior art, the method for measuring a spatial rotation angle of an object in the present invention comprises steps of: controlling projection of probe light onto an object whose rotation angle is to be measured, and controlling the rotation of the object whose rotation angle is to be measured; controlling a balance homodyne detector, by which the probe light reflected or transmitted by the object whose rotation angle is to be measured is detected to obtain light parameters of the reflected or transmitted probe light; and calculating a rotation angle of the object whose rotation angle is to be measured, according to the light parameters detected by the balance homodyne detector. The device of the present invention is simple, easy to operate, and high in practicality. The measurement precision is high, and measurements of a rotation angle beyond the SNL can be realized. The present invention can be applied in high-tech fields such as precise manufacturing, spatial remote-sensing and bioimaging.

DETAILED DESCRIPTION OF THE PRESENT INVENTION

The technical solutions of the present invention will be further described below in more details by specific implementations. Apparently, the embodiments described herein are some but not all of the embodiments of the present invention. All other embodiments obtained by a person of ordinary skill in the art based on the embodiments of the present invention, without paying any creative effort, shall fall into the protection scope of the present invention.

Figure 1:
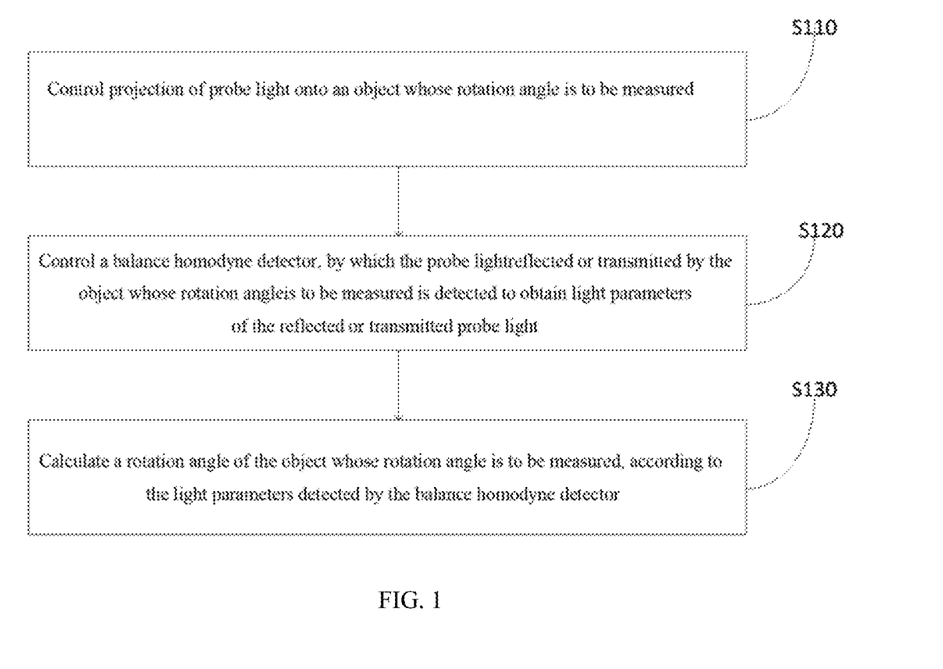
FIG. 1 is a flowchart of a method for measuring a spatial rotation angle of an object according to the present invention.

FIG. 1 is a flowchart of a method for measuring a spatial rotation angle of an object according to the present invention. This method comprises the following steps:

S110: controlling projection of probe light onto an object whose rotation angle is to be measured;

S120: controlling a balance homodyne detector, by which the probe light reflected or transmitted by the object whose rotation angle is to be measured is detected to obtain light parameters of the reflected or transmitted probe light; and S130: calculating a rotation angle of the object whose rotation angle is to be measured, according to the light parameters detected by the balance homodyne detector.

Wherein, before the step of controlling projection of probe light onto an object whose rotation angle is to be measured, the method further comprises a step of modulating the probe light, the probe light being obtained by coupling coherent beams in a weak Hermite-Gaussian HG01 mode and a strong Hermite-Gaussian HG10 mode on a beam splitter.

Wherein, before the step of controlling projection of probe light onto an object whose rotation angle is to be measured, the method further comprises a step of squeezing the weak Hermite-Gaussian HG01 mode.

Wherein, the light parameters of the reflected or transmitted probe light at least comprise a photon number of the probe light, a level of squeezing, and a reflection or transmission coefficient of the object to the probe light.

Wherein, the rotation angle of the object whose rotation angle is to be measured is expressed by:

$$\Delta\theta = \frac{A}{2\sqrt{N}} e^{-r}$$

where, N is the photon number of the probe light, r is the level of squeezing of the orbital angular momentum, A is the reflection or transmission coefficient of the object to the probe light.

The present invention is based on the sensitivity of the Hermite-Gaussian HG01 mode to the spatial rotation. When the probe light in the Hermite-Gaussian HG01 mode is irradiated onto a detected object and a small spatial rotation occurs, the HG10 model orthogonal to the HG01 mode will be excited, and the rotation angle is in direct proportion to the amplitude of the HG10 before the excitation. Therefore, the excited HG10 mode can be detected by BHD (balance homodyne detection) in the HG10 mode, correspondingly to the measurement of the rotation angle. However, the measurement precision in this case will be limited by vacuum noise. In order to further improve the measurement precision, squeezed light in the Hermite-Gaussian HG01 mode may be added to form squeezed probe light with orbital angular momentum, in order to inhibit the vacuum noise in the measurement and realize rotation-angle measurement beyond the quantum limit. The measurement precision is as follows:

$$\Delta\theta = \frac{A}{2\sqrt{N}} e^{-r}$$

where, N is the photon number of the probe light, r is the level of squeezing of the orbital angular momentum, A is the reflection or transmission coefficient of the object to the probe light.

Figure 2:
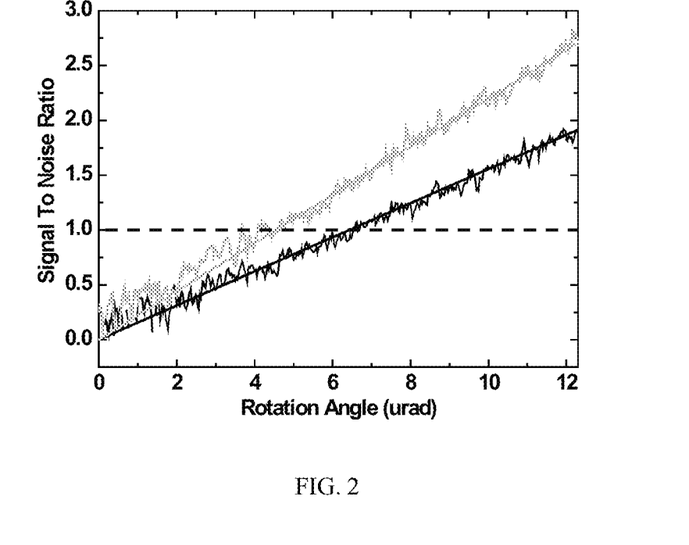
FIG. 2 is a schematic view of measurement structures of the method for measuring a spatial rotation angle of an object according to the present invention.

Specifically, the squeezed light in the Hermite-Gaussian HG01 mode, which is generated by an optical parametric oscillator, is coupled with coherent beam in the strong Hermite-Gaussian HG10 mode at a beam splitter, with their phases are locked to ensure that they are in phase, to generate coupled light. The coupled light is the squeezed probe light with orbital angular momentum.

The light in the weak Hermite-Gaussian HG10 mode is coupled with the probe light at a 50/50 beam splitter. The coupled light is passed through a detector. Signals input by the detector are, after subtraction, sent to an analyzer for signal analysis. During the measurement, the phase of light in the weak Hermite-Gaussian HG01 mode is locked to ensure that it is in phase with the probe light.

Figure 7:
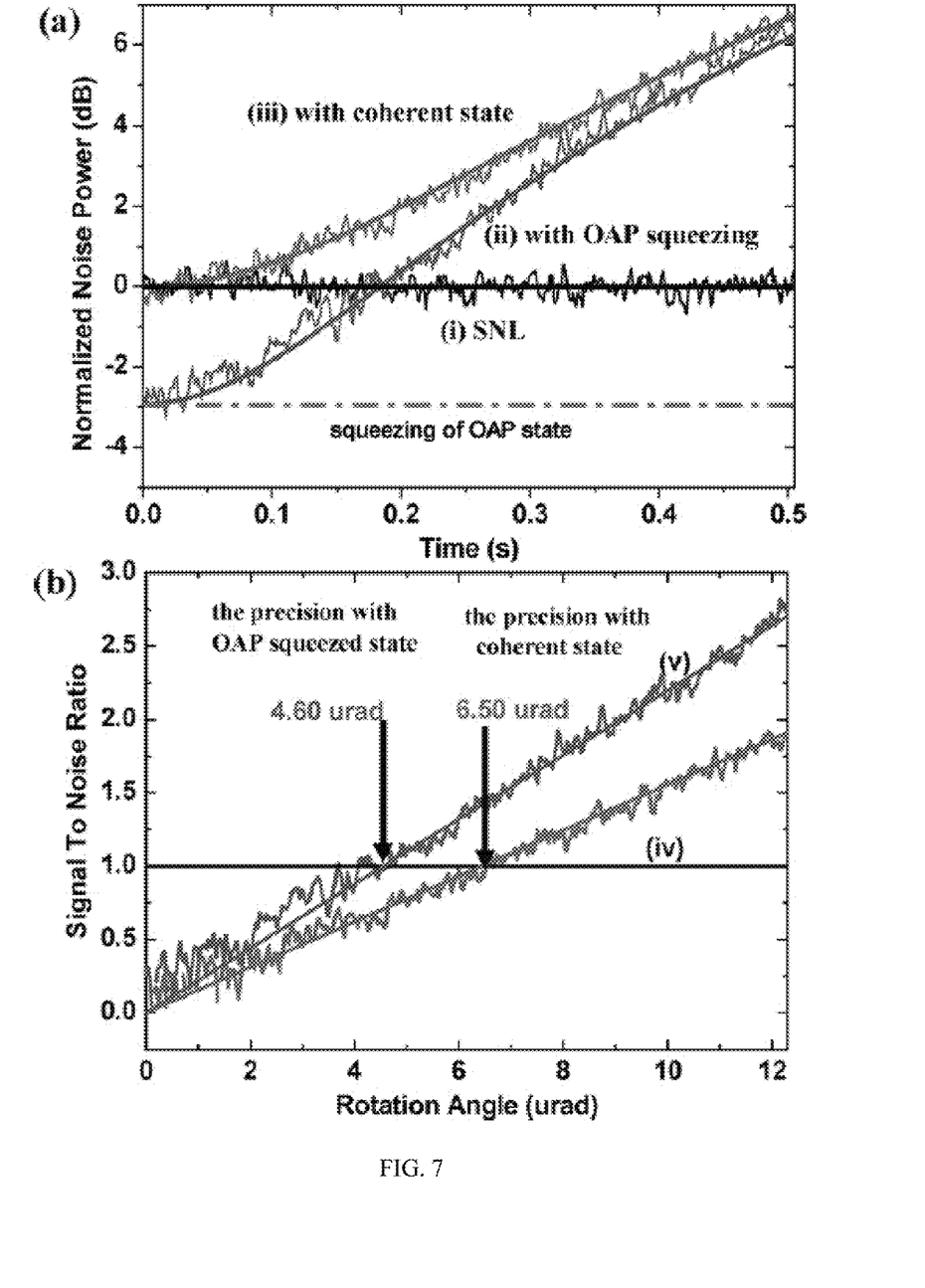
FIG. 7 is a schematic view of rotation precision measurements in an embodiment of the present invention.

In experiments, the probe light is 100 µW and the small rotation of an object is simulated by a Dove Prism. Wherein, the horizontal axis corresponds to the rotation angle of the object; the vertical axis corresponds to the signal noise ratio; the gray line shows the result when the level of squeezing of the probe is zero; the block line shows the result when the squeezing of the orbital angular momentum of the probe light is 3 dB; and the dotted line shows a signal noise ratio of 1. In this case, the corresponding angle is the minimum measurable angle. The results show that the measurement precision is 17.7 nrad/$\sqrt{Hz}$, and the precision can be significantly improved by the squeezing of the orbital angular momentum. The rotation-angle measurement precision can be further improved by increasing the intensity and the level of squeezing of the probe light.

Different from the prior art, the method for measuring a spatial rotation angle of an object in the present invention comprises steps of: controlling projection of probe light onto an object whose rotation angle is to be measured; controlling a balance homodyne detector, by which the probe light reflected or transmitted by the object whose rotation angle is to be measured is detected, to obtain light parameters of the reflected or transmitted probe light; and calculating a rotation angle of the object whose rotation angle is to be measured, according to the light parameters detected by the balance homodyne detector. The device of the present invention is simple, easy to operate, and high in practicality. The measurement precision is high, and measurements of a rotation angle beyond the SNL can be realized. The present invention can be applied in high-tech fields such as precise manufacturing, spatial remote-sensing and bioimaging.

In this embodiment, the specific principle proof and derivation process will be described below. We first give the commutation relation between the orbital angular position and the orbital angular momentum and also demonstrate the SNL with classical light. Based on the commutation relation, we define the associated squeezed state, referred to as the squeezed "OAP (orbital angular position)" state, with which we can enhance the precision of rotation measurements in the experiment, by 3.00±0.03 dB squeezing of the probe light to detect small rotation. We demonstrate a precision beyond the SNL and up to 17.7 nrad/√Hz using an optimal detection system based on BHD, which reaches the Cramer-Rao bound limit. The sub-shot noise rotation measurement has potential applications in high-precision sensing and monitoring of rotation vibrations, for example, in combination with a rotational optomechanics system to realize a high precision quantum gyroscope.

Figure 3:
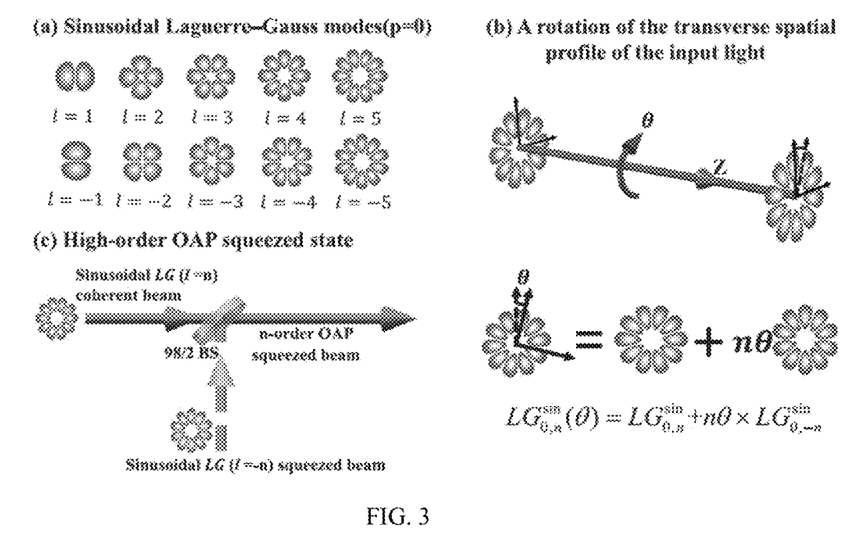
FIG. 3 is a schematic view of a principle proof and derivation process in an embodiment of the present invention.

Generally, for a rotation-angle measurement system, the probe field is a spatial multimode field, which in a quantum mechanical description is written as follows:

$$E_P^+(r,t) = i\sqrt{\frac{\hbar\omega}{2\varepsilon_0 cT}} \sum_{p=0}^{\infty}\sum_{l=-\infty}^{\infty} \hat{a}_{p,l}(t) u_{p,l}^{sin}(r), \quad (1)$$

where, $\omega$ is the field frequency, T is the integration time, $u_{p,l}^{sin}(r)$ is the transverse beam amplitude function of the sinusoidal LG modes ($LG^{sin}$), p is the radial mode index, and l is the azimuthal mode index. The sinusoidal LG mode is an alternative form of LG modes with a sinusoidal amplitude depending on the azimuthal angle [see the spatial intensity distribution of a sinusoidal Laguerre-Gaussian mode for p=0, as shown in FIG. 3(a)]. The sinusoidal LG modes with l=±1 and p=0 are also the first-order Hermite-Gaussian modes. The corresponding annihilation operators, $\hat{a}_{p,l} = \hat{X}_{p,l} + i\hat{Y}_{p,l}$, can be written in a linear approximation in the form $\hat{a}_{p,l} = \langle \hat{a}_{p,l} \rangle + \delta\hat{a}_{p,l}$, where $\langle \hat{a}_{p,l} \rangle$ denotes the coherent amplitude and $\delta\hat{a}_{p,l}$ corresponds to the small quantum fluctuations.

If the probe beam has only one $LG_{0,n}^{sin}$ mode (l=n, p=0), then $\langle \hat{a}_{p,l} \rangle = \sqrt{N}$ (N is the number of photons of the $LG_{0,n}^{sin}$ mode) with all other modes giving $\langle \hat{a}_{p\neq 0, l\neq n} \rangle = 0$, the probe field may be rewritten as:

$$E_P^+(r,t) = i\sqrt{\frac{\hbar\omega}{2\varepsilon_0 cT}}\left\{\sqrt{N} u_{0,n}^{sin}(r) + \sum_{p=0}^{\infty}\sum_{l=-\infty}^{\infty} \delta\hat{a}_{p,l}(t) u_{p,l}^{sin}(r)\right\}, \quad (2)$$

When the probe beam is rotated by a small angle $\theta$ about its direction of propagation z($\theta\ll 1$) [as shown in FIG. 3(b), a beam is rotated by a small angle $\theta$ about its direction of propagation z and the rotation-angle information is carried by its orthogonal mode component], the rotated field $E^+(\theta)$ may be expanded in a Taylor series as follows:

$$E_P^+(\theta) = i\sqrt{\frac{\hbar\omega}{2\varepsilon_0 cT}} \sqrt{N} [u_{0,n}^{sin}(r) + n\theta u_{0,-n}^{sin}(r)] + \sum_{p=0}^{\infty}\sum_{l=-\infty}^{\infty} \delta\hat{a}_{p,l}(t) u_{p,l}^{sin}(r), \quad (3)$$

Equation (3) states that the rotation angle of the $LG_{0,n}^{sin}$ mode beam is transferred to the amplitude of the $LG_{0,-n}^{sin}$ mode, and the rotation angle $\theta$ can be extracted by measuring the $LG_{0,n}^{sin}$ mode component of the field. Given the above equations, we introduce an OAP operator given by:

$$\hat{\theta} = \frac{1}{n\sqrt{N}}\hat{X}_{0,-n}, \quad (4)$$

where, $\theta = \langle \hat{\theta} \rangle$, $\hat{X}_{0,-n}$ is the amplitude quadrature of the $LG_{0,n}^{sin}$ mode component of the field, and the fluctuation of OAP is $$\Delta\hat{\theta} = \frac{1}{n\sqrt{N}}\Delta\hat{X}_{0,-n}.$$

Moreover, in accordance with the definition of a continuous-variable OAM state, $\hat{O}$ denoting the OAM along the z axis is given by:

$$\hat{O} = |l|(\hat{a}_{LG_0}^{\dagger}{}^l\hat{a}_{LG_0}{}^{+l} - \hat{a}_{LG_0}^{-l\dagger}\hat{a}_{LG_0}{}^{-l}) = 2n\sqrt{N}\hat{Y}_{0,-n}, \quad (5)$$

where $\hat{a}_{LG_0}{}^l$ is the l-order helical LG mode annihilation operator. The fluctuation of OAM is $\Delta\hat{O} = 2n\sqrt{N}\hat{Y}_{0,-n}$. Therefore, the OAM and OAP are conjugate observables and satisfy the following commutation relation and related uncertainty $\Delta\hat{\theta}*\Delta\hat{O}\geq 1$. From the above equations, we find that when the probe beam is a coherent state ($\Delta\hat{X}_{0,-n} = 1/2$ and $\Delta\hat{Y}_{0,-n} = 1/2$), it corresponds to the SNL of both OAM and OAP, $$\Delta\hat{\theta}_{SNL} = \frac{1}{2n\sqrt{N}}$$

and $\Delta\hat{O}_{SNL} = 2n\sqrt{N}$. If the vacuum $LG_{0,-n}^{sin}$ mode component in the probe field is squeezed in amplitude or phase quadrature ($\Delta\hat{X}_{0,-n} < 1/2$ on $\Delta\hat{Y}_{0,-n} < 1/2$), then the fluctuation of OAM or OAP is below the SNL $$\left(\Delta\hat{\theta} < \frac{1}{2n\sqrt{N}} \text{ or } \Delta\hat{O} < 2n\sqrt{N}\right).$$

This is analogous to the definition of the quadrature-squeezed state. We define the probe beam, which is a combination of a bright $LG_{0,n}^{sin}$ mode coherent state and a squeezed vacuum $LG_{0,-n}^{sin}$ mode state, as an n-order OAP- or OAM-squeezed state [as shown in FIG. 3(c), schematic for the generation of the OAP squeezed state]. In metrology, using a OAP-squeezed state as the probe beam, we can obtain a precise measurement of a rotation angle beyond the SNL, $$\Delta\hat{\theta} = \frac{1}{2n\sqrt{N}} e^{-r},$$

where r is the factor associated with squeezing.

To achieve the best possible measurement precision corresponding to the Cramer-Rao bound limit, we take the BHD method to demodulate the value of the angular displacement. In the BHD system, we generally consider the local oscillator field not to be in a pure $LG_{0,-n}^{sin}$ mode but in a spatial multimode field $u_L(r)$ (here, $u_L(r) = \Sigma_{p=0}^{\infty}\Sigma_{l=-\infty}^{\infty}\Gamma_p$, $_l u_{p,l}^{sin}(r)$, $\Sigma_n \Gamma_n^2 = 1$).

The local oscillator field is then written as:

$$E_L^+ = i\sqrt{\frac{\hbar\omega}{2\varepsilon_0 cT}}\left(\sqrt{N_L} u_L(r) + \sum_{p=0}^{\infty}\sum_{l=-\infty}^{\infty} \delta\hat{a}_{p,l}^L(t) u_{p,l}^{sin}(r)\right) e^{i\varphi L}, \quad (6)$$

where, φL is the phase between the local oscillator field and the probe beam. The output signal of the BHD system is given by:

$$\hat{i} \propto \int dr \langle E_L^\dagger E_p(\theta) - E_p^\dagger(\theta) E_L \rangle = 2\sqrt{N_L}N(\Gamma_{0,n} + n\Gamma_{0,-n}\theta(\Omega))\cos(\varphi_L) + 2\sqrt{N_L}\sum_{p=0}^{\infty}\sum_{l=-\infty}^{\infty}\Gamma_{p,l}\delta\hat{X}_{p,l}^{\varphi_L}(\Omega), \quad (7)$$

The signal noise ratio (SNR), which equals the intensity of the rotation signal [the term in Eq. (7), depending on θ] divided by the detection noise [the last term in Eq. (7)], may be deduced as follows:

$$SNR = \left| \frac{n\sqrt{N}\,\Gamma_{0,-n}\theta(\Omega)\cos\varphi_L}{\sqrt{\sum_{p=0}^{\infty}\sum_{l=-\infty}^{\infty}\Gamma_{p,l}^2\delta^2\hat{X}_{p,l}^{\varphi_L}(\Omega)}} \right|, \quad (8)$$

where, Ω is the modulation frequency of the rotation signal. When $\varphi_L = m\pi$ (m=0, 1, 2 . . . ), we obtain maximum SNR corresponding to the measurement of the amplitude quadrature. When the probe beam is a coherent state, $\delta\hat{X}_{p,l}^{\varphi_L}(\Omega) = 1/2$ and SNR=$2n\sqrt{N}\Gamma_{0,-n}\theta(\Omega)$. When the probe beam is an OAP-squeezed state, $\delta\hat{X}_{p,l\neq 01}(\Omega) = 1/2$ and $\delta\hat{X}_{0,-n}(\Omega) = e^{-r}/2$. Hence, $$S/N = \frac{2n\sqrt{N}\,\Gamma_{0,-n}\theta(\Omega)}{\sqrt{1 - \Gamma_{0,-n}^2(1 - e^{-2r})}}.$$

If the local field is a perfect $LG_{0,-n}^{sin}$ mode, the measurement precision attains its optimal theoretical value. As for the impurity of the mode, detection loss modifies SNR giving a final form:

$$SNR = \frac{2n\sqrt{N}\,\Gamma_{0,-n}\sqrt{\eta_{det}}\,\theta(\Omega)}{\sqrt{1 - \Gamma_{0,-n}^2\eta_{det}(1 - e^{-2r})}}, \quad (9)$$

where, $\eta_{det}$ is the detection efficiency, which accounts for the propagation loss and detector efficiency. When S/N=1, we obtain the minimum precision of the measurement:

$$\theta_{min} = \frac{\sqrt{1 - \Gamma_{0,-n}^2\eta_{det}(1 - e^{-2r})}}{2n\sqrt{N}\,\Gamma_{0,-n}\sqrt{\eta_{det}}}, \quad (10)$$

In the experiment, the photon number N(N=PΔt/ℏω) is determined from both the optical power of the probe beam P and the integration time of the detection system Δt(Δt≈1/RBW), where RBW is the resolution bandwidth of the spectrum analyzer.

Figure 4:
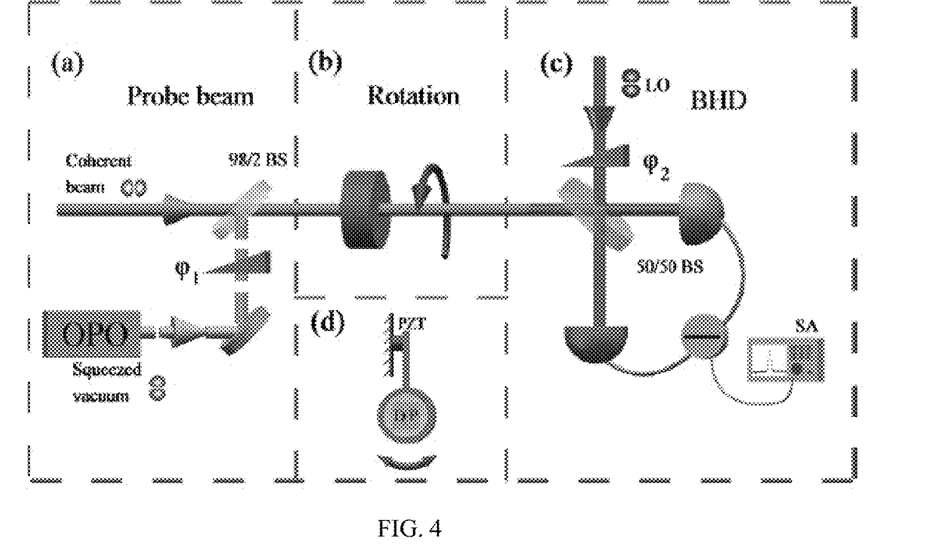
FIG. 4 is a schematic view of an experimental device for measuring a rotation angle in an embodiment of the present invention.

Here, we demonstrate the proof of principle experiment with a first-order OAP squeezed state. As shown in FIG. 4 (where, (a) generation of the probe beam; (b) probe beam passing through the rotation device; (c) rotated probe light is measured by the balance homodyne detection (BHD); (d) schematic of the rotation device), in the experimental setup for the rotation-angle measurement, a 2 µW squeezed beam in the $LG_{0,-1}^{sin}$ mode at 1080 nm was generated by using an optical parametric amplifier (OPA). As shown in FIG. 4(a), the squeezed beam was coupled with a 100 µW bright coherent beam in the $LG_{0,1}^{sin}$ mode at a 98/2 beam splitter (BS) (the coupling efficiency was 99.0±0.5%) to generate an OAP-squeezed beam. Next, as shown in FIG. 4(b), the OAP-squeezed beam as the probe beam is passed through a beam rotation device which simulates an object rotating with rotational frequency Ω. As shown in FIG. 4(c), the probe light receives a small rotation about its propagation direction. Finally, the probe light carrying the rotational information of the rotation device is interrogated by the BHD using a 4 mW local oscillator (LO) beam in the $LG_{0,-1}^{sin}$ mode incident on a spectrum analyzer to read the measurement results. As shown in FIG. 4(d), the beam rotation device is a rotated Dove Prime. The rotation of the Dove Prism is achieved using a PZT (piezo-electric transducer)-actuator based on the lever principle with the center of the Dove Prism as fulcrum. In FIG. 4, OPO: optical parametric oscillator; BS: beam splitter; LO: local oscillator beam; PD: photodiode; SA: spectrum analyzer.

Figure 5:
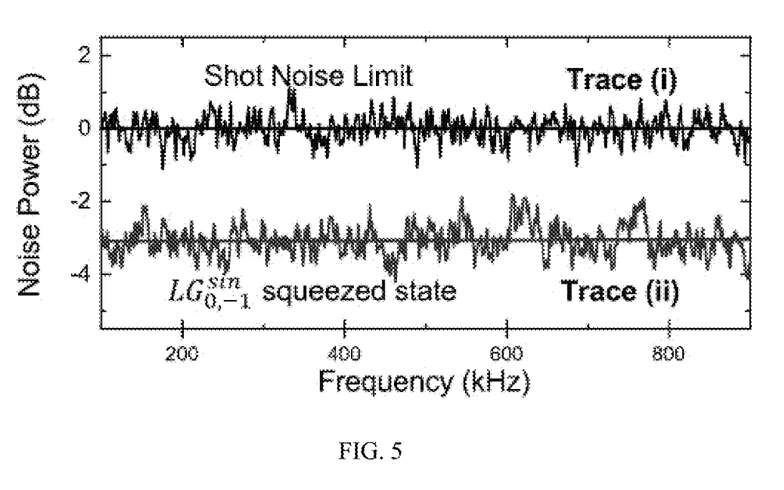
FIG. 5 is the squeezing spectrum of the $LG_{0,-1}^{sin}$ mode from 100 kHz to 900 kHz in an embodiment of the present invention.
Figure 6:
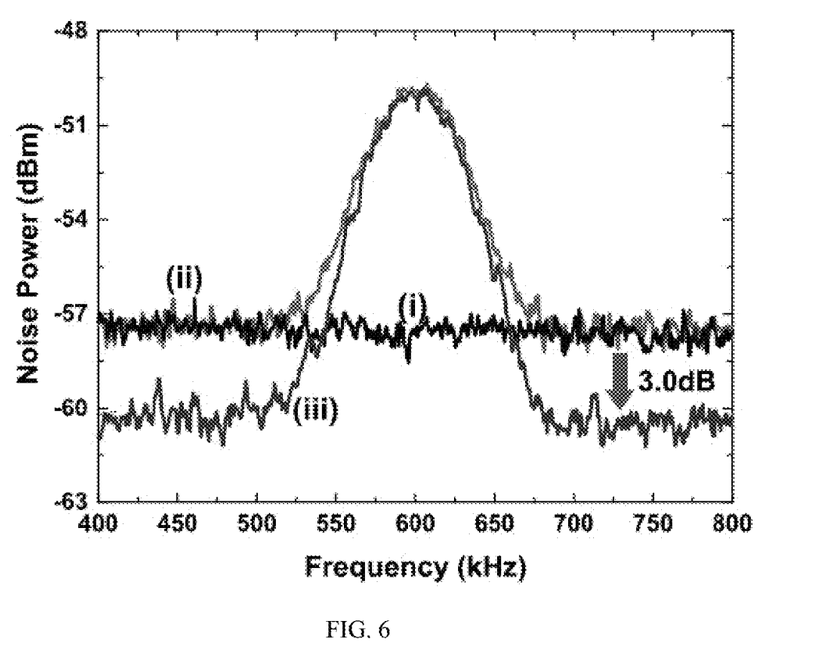
FIG. 6 is the squeezing spectrum of the $LG_{0,-1}^{sin}$ mode from 400 kHz to 800 kHz in an embodiment of the present invention.

Furthermore, we analyzed the squeezing spectrum of the $LG_{0,-1}^{sin}$ mode squeezed state from 100 kHz to 900 kHz (FIG. 5) showing squeezing to be 3.10±0.03 dB. Here, the total detection efficiency is 0.74±0.04, where the transmitting efficiency is 0.91±0.02, the measuring efficiency of the photodiode (ETX500) is 0.90±0.01, and the spatial overlap efficiency between the squeezed beam and the local oscillator beam on the homodyne detector is 0.90±0.02. Hence, the inferred squeezing in the $LG_{0,-1}^{sin}$ mode is 5.12±0.68 dB. We demonstrate the rotation-angle measurement of a rotating device revolving at a frequency of Ω=600 kHz. The measurements were recorded and displayed (FIG. 6) using a spectrum analyzer with a resolution bandwidth (RBW) of 300 kHz and a video bandwidth (VBW) of 100 Hz at analyzed frequencies from 400 to 800 kHz. Trace (i) shows the shot noise level, which is measured by blocking the probe light. In the experiment, the power of the LO is 4 mW, which is much higher than the power of the probe light (100 µW), guaranteeing that the SNL is accurate; Trace (ii) is achieved when the probe light is coherent; in the experiment, only the $LG_{0,-1}^{sin}$ mode squeezed light is blocked when measured. Trace (iii) corresponds to the measurement result with the probe light in the OAP-squeezed state. Traces (ii) and (iii) are obtained when the phase of the LO is locked to ensure that it is in phase with the probe light. From FIG. 6, we see a distinct peak centered at a frequency of 600 kHz, corresponding to the frequency of the measured rotation signal. With the probe light in the OAP-squeezed state, the measurement noise is below the SNL 3.00±0.03 dB, which is slightly lower than the squeezing of the $LG_{0,-1}^{sin}$ mode mainly because of losses at the 98/2 beam splitter (as shown in FIG. 4(a)).

Further, we also give the measurement of the rotation signal, the amplitude of which slowly increases over time, at 600 kHz with a resolution bandwidth (RBW) of 68 kHz and a video bandwidth (VBW) of 68 Hz. As seen in FIG. 7(a), Trace (ii) corresponds to the measurement performed with a coherent beam and represents the optimal precision that can be achieved with classical light. With no modulation signal, Trace (ii) corresponds to the SNL for background noise with a coherent beam. Trace (iii) corresponds to the measurement performed with an OAP-squeezed beam. With no modulation signal, it corresponds to the level of squeezing of the state and represents the background noise of the squeezed beam. FIG. 7(b) shows the SNL obtained by processing the data from (a) to normalize the respective noise levels for the coherent beam [Trace (v)] and squeezed beam [Trance (iv)]. The horizontal axis corresponds to the rotation angle which determines the theoretical value based on Eq. (9). In ramping the rotation angle, the SNR obtained using the squeezed beam increases more rapidly than for the coherent beam. For a given SNR, the squeezed measurement yields a small rotation angle than does the coherent case. SNR=1 (solid black line) corresponds to the best precision in measurement with a 68% confidence level. In our experiment, we has a power of 100 μW, a detection efficiency of 0.74, RBW=68 kHz and VBW=68 Hz; the best precision in measurements with a coherent beam yield 6.50 urad $\theta_{min}^{coh}$, whereas for the squeezed beam, it is 4.60 urad $\theta_{min}^{coh}$, which corresponds to sensitivity values of 24.9 nrad/√Hz nd 17.7 nrad/√Hz. Thus, an improvement by a factor of 1.4 has been achieved over the quantum noise limited coherent state.

The foregoing description merely shows implementations of the present invention and is not intended to limit the patent scope of the present invention. All equivalent structures or equivalent flow transformations made by using the contents of the specification and drawings of the present invention or direct or indirect applications thereof in other related technical fields shall fall into the patent protection scope of the present invention.

What is claimed is:

1. A method for measuring a spatial rotation angle of an object, comprising steps of:
   controlling projection of probe light onto an object whose rotation angle is to be measured; controlling a balance homodyne detector, by which the probe light reflected or transmitted by the object whose rotation angle is to be measured is detected to obtain light parameters of the reflected or transmitted probe light; and
   calculating a rotation angle of the object whose rotation angle is to be measured, according to the light parameters detected by the balance homodyne detector.

2. The method for measuring a spatial rotation angle of an object according to claim 1, before the step of controlling projection of probe light onto an object whose rotation angle is to be measured, further comprising a step of modulating the probe light, the probe light being obtained by coupling coherent beams in a weak Hermite-Gaussian HG01 mode and a strong Hermite-Gaussian HG10 mode on a beam splitter.

3. The method for measuring a spatial rotation angle of an object according to claim 2, before the step of controlling projection of probe light onto an object whose rotation angle is to be measured, further comprising a step of squeezing the weak Hermite-Gaussian HG01 mode.

4. The method for measuring a spatial rotation angle of an object according to claim 1, wherein the light parameters of the reflected or transmitted probe light at least comprise a photon number of the probe light, a level of squeezing, and a reflection or transmission coefficient of the object to the probe light.

5. The method for measuring a spatial rotation angle of an object according to claim 1, wherein the rotation angle of the object whose rotation angle is to be measured is expressed by:

$$\Delta\theta = \frac{A}{2\sqrt{N}}e^{-r}$$

where, N is the photon number of the probe light, r is the level of squeezing of the orbital angular momentum, A is the reflection or transmission coefficient of the object to the probe light.

6. The method for measuring a spatial rotation angle of an object according to claim 1, wherein, as a way of rotating the object whose rotation angle is to be measured, the object whose rotation angle is to be measured is rotated by a PZT (piezo-electric transducer)-actuator based on the lever principle.

7. The method for measuring a spatial rotation angle of an object according to claim 6, wherein the center of the object whose rotation angle is to be measured is the fulcrum of the PZT-actuator.

8. The method for measuring a spatial rotation angle of an object according to claim 7, wherein the object whose rotation angle is to be measured is a Dove Prism.

9. The method for measuring a spatial rotation angle of an object according to claim 1, wherein the probe light is interrogated by the balance homodyne detector using a 4 mW local oscillator beam on a spectrum analyzer to read measurement results.

* * * * *